US 6,540,948 B2

(12) United States Patent
McCullough

(10) Patent No.: US 6,540,948 B2
(45) Date of Patent: Apr. 1, 2003

(54) INJECTION MOLDING APPARATUS WITH BLEED OFF POCKET FOR OVERMOLDING HEAT PIPES

(75) Inventor: Kevin A. McCullough, Warwick, RI (US)

(73) Assignee: Cool Options, Inc., Warwick, RI (US)

( * ) Notice: Subject to any disclaimer, the term of this patent is extended or adjusted under 35 U.S.C. 154(b) by 205 days.

(21) Appl. No.: 09/757,744

(22) Filed: Jan. 10, 2001

(65) Prior Publication Data
US 2001/0022414 A1 Sep. 20, 2001

Related U.S. Application Data
(60) Provisional application No. 60/175,498, filed on Jan. 11, 2000.

(51) Int. Cl.⁷ .......................... B29C 33/10; B29C 45/14; B29C 45/34; B29C 70/70; B29C 70/88
(52) U.S. Cl. .................... 264/105; 264/271.1; 264/275; 264/277; 425/123; 425/812
(58) Field of Search ................. 264/104, 105, 264/259, 263, 271.1, 275, 277, 328.14, 328.16; 425/116, 123, 546, 812

(56) References Cited
U.S. PATENT DOCUMENTS

| 2,997,770 A | * | 8/1961 | Beltz ........................... 264/28 |
| 3,557,264 A | * | 1/1971 | Getz et al. .................. 264/46.7 |
| 4,850,060 A | * | 7/1989 | Kou .............................. 4/237 |
| 5,045,972 A | * | 9/1991 | Supan et al. ................. 361/706 |
| 5,366,688 A | * | 11/1994 | Terpstra et al. ................ 419/36 |
| 5,705,008 A | * | 1/1998 | Hecht .......................... 156/148 |
| 5,737,840 A | * | 4/1998 | Akachi .................... 29/890.32 |
| 5,834,337 A | * | 11/1998 | Unger et al. ................. 438/122 |
| 6,139,783 A | * | 10/2000 | McCullough .............. 264/40.1 |
| 6,214,263 B1 | * | 4/2001 | McCullough .............. 264/40.1 |
| 6,478,997 B2 | * | 11/2002 | McCullough .............. 264/108 |

* cited by examiner

Primary Examiner—Angela Ortiz
(74) Attorney, Agent, or Firm—Barlow, Josephs & Holmes, Ltd.

(57) ABSTRACT

A method of overmolding a heat pipe includes providing an injection mold apparatus having a cavity, an input gate, a bleed off overflow gate in communication with the cavity and a tubular heat pipe charged with phase change media which is capable of being collapsed by imparting an external collapsing pressure. The tubular heat pipe is placed into the cavity in the injection mold apparatus. A net shape moldable thermally conductive material is introduced into the cavity and around the tubular pipe. The bleed off overflow gate is set to open at a predetermined pressure which less than the external collapsing pressure which would damage the heat pipe to be overmolded. Pressure is relieved in the cavity of the mold apparatus through the bleed off overflow gate when pressure in the bleed off overflow gate reaches the predetermined pressure. As a result, delicate heat pipes can be overmolded in an injection mold apparatus without damage to the heat pipe during the molding process.

6 Claims, 3 Drawing Sheets

INJECTION MOLDING APPARATUS WITH BLEED OFF POCKET FOR OVERMOLDING HEAT PIPES

This application claims the benefit of Provisional application Ser. No. 60/175,498, filed Jan. 11, 2000.

BACKGROUND OF THE INVENTION

The present invention relates generally to the cooling of heat generating surfaces and objects. More specifically, the present invention relates to a method of manufacturing a heat pipe construction for dissipating heat generated by such objects. In addition, the present invention relates to cooling of heat generating objects passively by use of a phase-change media within a heat pipe construction without the use of external fans or devices to assist in cooling.

In industry, there are various parts and components that generate heat during operation. For example, in the electronics and computer industries, it is well known that computer components generate heat during operation. Various types of electronic device packages and integrated circuit chips, such as the PENTIUM central processing unit chip (CPU) manufactured by Intel Corporation and RAM (random access memory) chips are such devices that generate heat. These integrated circuit devices, particularly the CPU microprocessor chips, generate a great deal of heat during operation which must be removed to prevent adverse effects on operation of the system into which the device is installed. For example, a PENTIUM microprocessor, containing millions of transistors, is highly susceptible to overheating which could destroy the microprocessor device itself or other components proximal to the microprocessor.

There are a number of prior art methods to cool heat generating components and objects to avoid device failure and overheating, as discussed above. A block heat sink or heat spreader is commonly placed into communication with the heat generating surface of the object to dissipate the heat therefrom. Such a heat sink typically includes a base member with a number of individual cooling members, such as fins, posts or pins, to assist in the dissipation of heat. The geometry of the cooling members is design to improve the surface area of the heat sink with the ambient air for optimal heat dissipation. The use of such fins, posts of pins in an optimal geometrical configuration greatly enhances heat dissipation compared to devices with no such additional cooling members, such as a flat heat spreader.

To further enhance air flow and resultant heat dissipation, fans and devices have been used, either internally or externally. However, these external devices consume power and have numerous moving parts. As a result, heat sink assemblies with active devices are subject to failure and are much less reliable than a device which is solely passive in nature.

It has been discovered that more efficient cooling of electronics can be obtained through the use of passive heat pipes which require no external power source and contain no moving parts. Generally, the heat pipe is in the form a vacuum-tight vessel in a particular geometric shape which is evacuated and partially filled with a working fluid. The heat pipe passively transfers heat from a heat source to a heat sink where heat is dissipated. As the heat is conducted into the heat pipe, the fluid is vaporized in an evaporator section creating a pressure gradient in the heat pipe. This forces the vapor to flow along the heat pipe to the condenser section, where the vaporized fluid is condensed and turned back to its fluid state by giving up its latent heat of vaporization. The working fluid is then returned to the evaporator section to repeat the process of removing the heat generated by the heat source. One method used to achieve cooling by use of a heat pipe places the evaporator section at the lower end and the condenser section at the upper end where the heat pipe is in a substantially vertical position. Once the working fluid has been condensed, the liquid flows by gravity back to the evaporator section. Internal wick structures may be used to assist liquid flow back to the evaporator section by capillary action to reduce the effect of gravity on the device.

Alternatively, the heat pipe may be simply filled with the working fluid to create a vapor chamber therein when the liquid is heated by the heat generating object. It is well known in the prior art that vaporized water or ammonia is highly thermally conductive and greatly facilitates the transfer of heat.

Heat pipes alone are known devices for use in dissipating heat from a heat generating object. However, heat pipes are typically tubular in configuration and do not interface well with objects to be cooled. Further, heat pipes, due to their tubular configuration, do not interface well with the ambient air for dissipation of heat. For example, a typical heat pipe may only be a few centimeters in diameter while the object to be cooled may be a microprocessor which is two inches square in shape. As a result, the affixation of such a heat pipe to a microprocessor results in a very inefficient transfer of heat from such a large heat generating surface to a small surface area about one side of the diameter of a heat pipe. Further, the exposure of the free end, not connected to a heat generating object, to the ambient air is also inefficient because the surface area of the diameter of the heat pipe is relatively small thus making the dissipation of heat even more inefficient.

While is desirable to cast a heat sink assembly or overmold a thermally conductive configuration about a heat pipe, there is a serious risk of damage to the heat pipe during the casting or molding process. If the tubular pipe is cracked or split during formation of the heat sink configuration, the heat pipe media will leak and the heat pipe will not operate properly resulting in a deleterious effect on the thermal conductivity of the overall heat dissipation device. In the prior art, heat pipes are well-known devices for moving heat from one place to another. In particular, a heat pipe is typically an enclosed tube with a volume of water or ammonia therein. A first end of the heat pipe is placed in communication with a heat generating object, such as a microprocessor chip that runs hot. The media (water or ammonia) turns into a gas when in communication with heat that is of a sufficient temperature which causes the vapor to travel to the opposite end of the heat pipe thus transferring heat along with it.

It is highly desirable to embed a heat pipe within a thermally conductive moldable composition to further enhance the overall thermal performance of the heat pipe. For example, it is highly desirable to overmold a thermally conductive material with a number of pins or fins, or other heat dissipating elements. These additional heat dissipating elements improve the overall thermal conductivity of the heat pipe because the outer geometry is now improved to better dissipate heat when in communication with the air.

In view of the prior art, an improved method of overmolding a heat pipe to provide complex geometries would be desirable to improve the overall heat dissipating qualities of the heat pipe. A method for relieving pressure during the overmolding of a delicate heat pipe construction is highly desirable to prevent damage to the heat pipe. In view of the foregoing, there is a demand for a heat pipe construction and a method for manufacturing such a construction that is less expensive than the prior art yet provides superior heat dissipation. There is a demand for a passive heat pipe construction with no moving parts that can provide heat dissipation without the use of active components. In addition, there is a demand for a method of manufacturing a heat pipe construction that enables additional heat dissipating material to be cast or mold around a heat pipe without risk of damage to the heat pipe itself.

SUMMARY OF THE INVENTION

The present invention preserves the advantages of prior art heat dissipation, heat exchanger devices and heat pipes. In addition, it provides new advantages not found in currently available devices and overcomes many disadvantages of such currently available devices.

The invention is generally directed to a method of overmolding a heat pipe that includes providing an injection mold apparatus having a cavity, an input gate, a bleed off overflow gate in communication with the cavity and a tubular heat pipe charged with phase change media which is capable of being collapsed by imparting an external collapsing pressure. The tubular heat pipe is placed into the cavity in the injection mold apparatus. A net shape moldable thermally conductive material is introduced into the cavity and around the tubular pipe. The bleed off overflow gate is set to open at a predetermined pressure which less than the external collapsing pressure which would damage the heat pipe to be overmolded. Pressure is relieved in the cavity of the mold apparatus through the bleed off overflow gate when pressure in the bleed off overflow gate reaches the predetermined pressure. As a result, delicate heat pipes can be overmolded in an injection mold apparatus without damage to the heat pipe during the molding process.

It is therefore an object of the present invention to provide a method for overmolding a heat pipe that enables thermally conductive injection moldable material to be molded around a delicate heat pipe.

It is an object of the present invention to provide a method for overmolding a heat pipe construction that does not damage the heat pipe to be overmolded.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
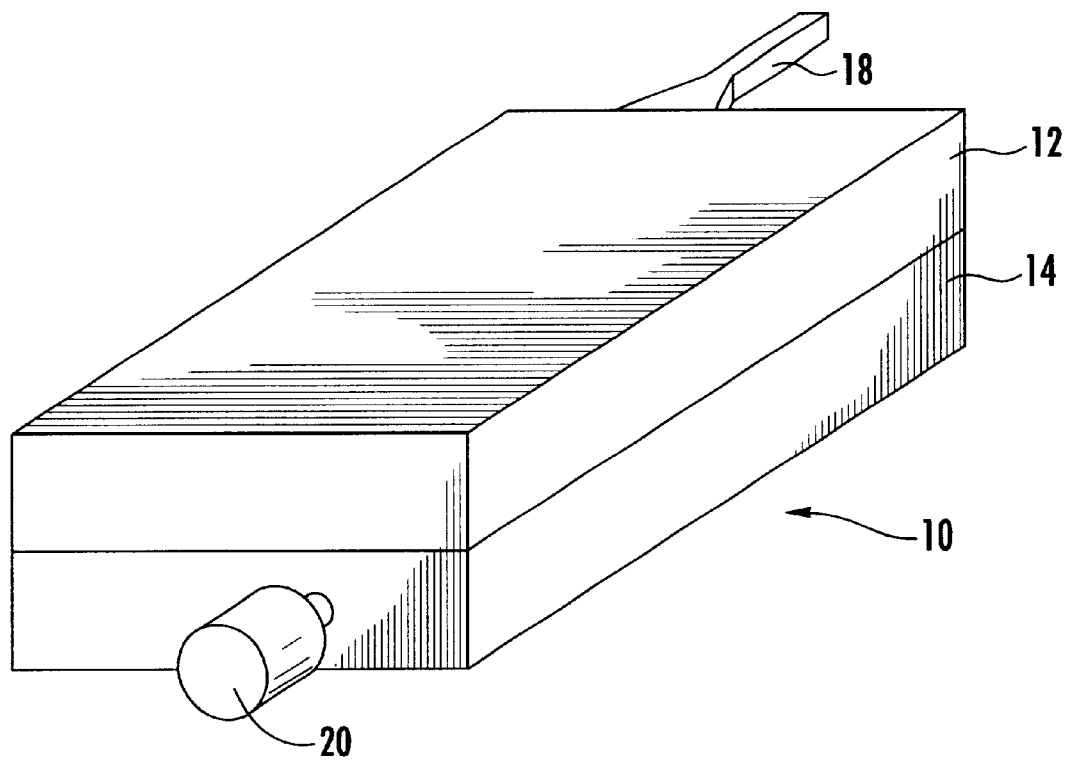
FIG. 1 is perspective view of an injection mold apparatus used to carrying out the method of the present invention.
Figure 2:
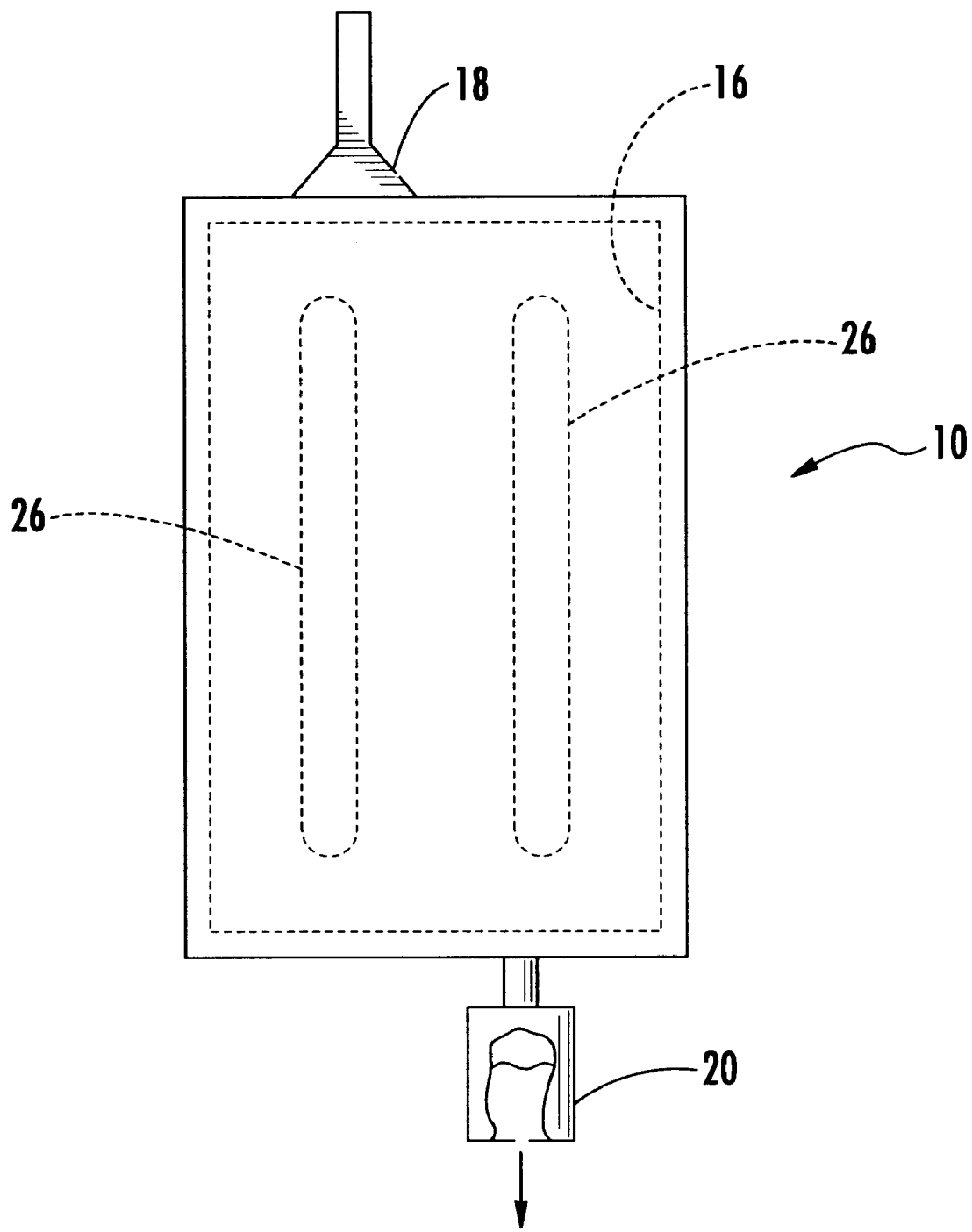
FIG. 2 is a top view of the injection mold apparatus of FIG. 1.

As shown in FIGS. 1 and 2 an injection mold assembly 10 is shown which is employed for carrying out the method of the present invention. A top mold half 12 and a bottom mold half 14 complimentary mate with one another to form a mold assembly 10 with a mold cavity 16 therein. An input gate 18 is used to introduce molding material into the mold cavity 16. A bleed off mechanism 20 is provided in the form of an overflow valve gate or in the form of an overflow pocket. An overflow pocket is preferred for the bleed off mechanism 20 and is well-suited for most applications.

Figure 3:
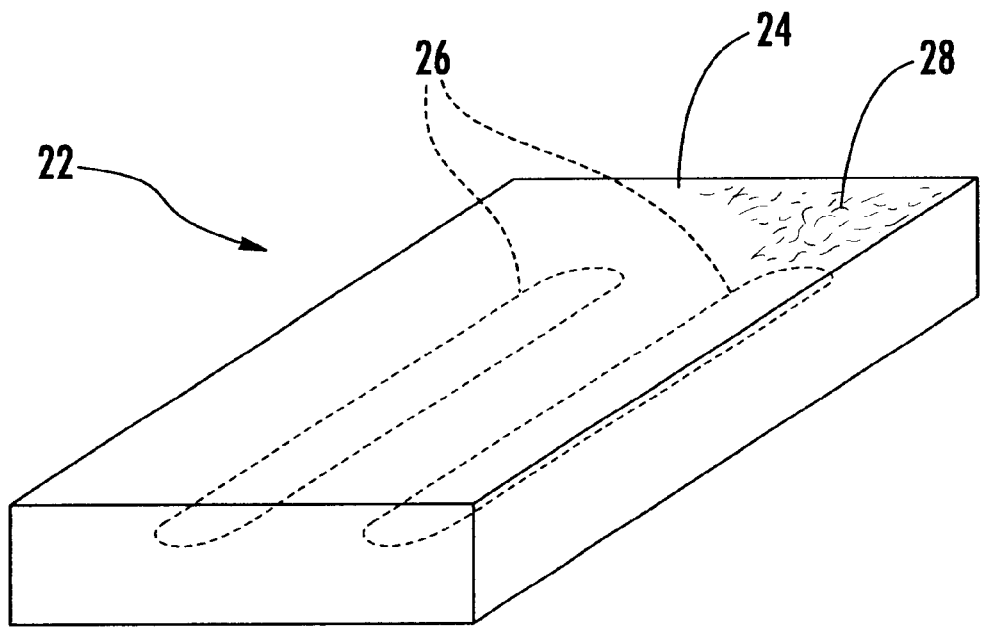
FIG. 3 is a sample overmolded heat pipe construction manufactured in accordance with the present invention.

As stated above, it is highly desirable to form a thermally conductive member that includes heat pipes therein. For example, the heat spreader 22 shown in FIG. 3 is one of many examples of a heat sink configuration where thermally conductive material 24 is overmolded about an array of heat pipes 26. The different configurations and geometries capable of being formed with the method the present invention is not limited to the heat spreader construction 22 shown in FIG. 3. For example, additional fins or pins (not shown) may be incorporated into the heat spreader construction 22 to enhance the overall thermal conductivity of the device or to specifically address the environment into the which the heat sink 22 is installed. As can be understood, the mold assembly 10 is appropriately modified to mold the desired elements of the heat sink assembly 22. In addition, the use of two heat pipes in the figures are shown by way of example. More or less than two heat pipes 26 may be employed in a heat sink assembly 22 that is formed in accordance with the present invention.

In accordance with the method of the present invention, the desired number of delicate heat pipes 26 are placed into the bottom mold half 14 in the appropriate respective positions. In the preferred embodiment, the heat pipes 26 are spaced apart from one another positioned substantially in center of the mold cavity 16. The top mold half 12 is mated with the bottom mold half 14 to form the completely mold assembly 10 with heat pipes 26 contained therein.

Next, the thermally conductive mold material 24, shown in a cured state in FIG. 3, is fluidly introduced into the mold assembly 10 via the input gate 18. The thermally conductive material, generally referenced as 24, is preferably a net shape moldable polymer based composition. The thermally conductive composition 24 preferably includes a liquid crystal polymer base matrix material loaded with a PITCH based high aspect ratio carbon fiber filler 28 which is representationally shown in FIG. 3. Alternatively, the filler 28 may be other highly thermally conductive materials, such as aluminum, copper, magnesium and boron nitride. The filler 28 may be in the form of fiber, flake and grains. The filler 28 may also be a combination of any of the aforementioned fillers. Still further, the thermally conductive molding material 24 may also be pure or composite metal, such as aluminum. However, the above polymer base matrix loaded with thermally conductive filler 28 is preferred to achieve high thermal conductivities and enable the formation of complex heat sink body geometries.

The thermally conductive mold material 24 fills the mold cavity 16 and surrounds the heat pipes 26 residing within the mold cavity 16. As stated above, heat pipes 26 are relatively delicate structures in that they are hollow tubes and can only withstand a given amount of external pressure before collapsing or becoming damaged. If this external threshold is reached during the molding process, the heat pipes 26 will become damaged thus severely lowering the overall thermal conductivity of the heat sink assembly or heat spreader 22 into which the heat pipes 26 have been molded. This heat pipe threshold pressure is a concern because it is well known in the art of injection molding that the introduction of molding material 24 dramatically increases the pressure within the mold cavity 16. As a result, care must be taken to avoid the build up of pressure within the mold assembly 10 that exceeds the damage threshold pressure of the heat pipes 26 being overmolded.

In accordance with the present invention, a bleed off overflow gate 20 is provided to address the foregoing concerns. As seen in FIGS. 1 and 2, a bleed off overflow gate 20 is connected to and is in fluid communication with mold cavity 16 of the mold assembly 10. This overflow gate 20 is set to open at a predetermined pressure which is, preferably, less than the threshold pressure which would crush or destroy the heat pipes 26 currently being overmolded. During injection molding, if the pressure exceeds an amount that would damage the heat pipes 26, the overflow gate 20 will automatically provide a release for excess pressure and/or molding material 24.

In view of the foregoing method and associate mold assembly of the present invention, a heat sink device 22, such as the heat spreader shown in FIG. 3, can be manufactured with embedding heat pipes 26 to enhance thermal conductivity of the overall device 22. The present invention enables such a construction to be reliably manufactured where the delicate heat pipes 26 are not damaged during the molding process.

It would be appreciated by those skilled in the art that various changes and modifications can be made to the illustrated embodiments without departing from the spirit of the present invention. All such modifications and changes are intended to be covered by the appended claims.

What is claimed is:

1. A method of manufacturing a heat pipe construction, comprising the steps of:

providing an injection mold apparatus having a cavity;

providing an input gate;

providing a bleed off overflow gate in communication with said cavity;

providing a tubular heat pipe charged with phase change media which is capable of being collapsed by imparting an external collapsing pressure;

placing said tubular heat pipe into said cavity in said injection mold apparatus;

introducing, via said input gate, a net shape moldable thermally conductive material into said cavity and around said tubular pipe;

setting said bleed off overflow gate to open at a predetermined pressure which less than said external collapsing pressure; and relieving pressure in said cavity of said mold apparatus through said bleed off overflow gate when pressure in said bleed off overflow gate reaches said predetermined pressure.

2. The method of claim 1, wherein said step of providing a tubular heat pipe charged with phase change media is providing a tubular heat pipe charged with water.

3. The method of claim 1, wherein said step of providing a tubular heat pipe charged with phase change media is providing a tubular heat pipe charged with ammonia.

4. The method of claim 1, wherein said step of introducing, via said input gate, a net shape moldable thermally conductive material into said cavity and around said tubular pipe is introducing, via said input gate, a net shape moldable thermally conductive material having a base polymer matrix and thermally conductive filler therein.

5. The method of claim 4, wherein said thermally conductive filler is selected from the group consisting of carbon fiber, copper flakes, boron nitride and aluminum flakes.

6. An injection mold apparatus capable of overmolding a heat pipe having a pressure at which it collapses, comprising:

an upper mold half;

a lower mold half; said low mold and said upper mold being matable together to form a mold cavity therebetween;

an input gate in communication with said mold cavity;

a bleed off overflow gate in communication with said mold cavity; said bleed off overflow gate opening and relieving pressure on a heat pipe to be overmolded at a predetermined pressure which less than said a pressure at which a heat pipe will collapse.

* * * * *